United States Patent
Hirose et al.

(10) Patent No.: US 6,893,678 B2
(45) Date of Patent: May 17, 2005

(54) WATER-BASED COATING COMPOSITION FOR INNER SURFACE OF CAN AND METHOD OF COATING INNER SURFACE OF CAN

(75) Inventors: Yuji Hirose, Hiratsuka (JP); Reijiro Nishida, Chigasaki (JP); Keiji Inomata, Hiratsuka (JP); Hideo Yokoi, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 328 days.

(21) Appl. No.: 10/275,958

(22) PCT Filed: Apr. 3, 2002

(86) PCT No.: PCT/JP02/03320

§ 371 (c)(1),
(2), (4) Date: Nov. 15, 2002

(87) PCT Pub. No.: WO02/083801

PCT Pub. Date: Oct. 24, 2002

(65) Prior Publication Data

US 2003/0113462 A1 Jun. 19, 2003

(30) Foreign Application Priority Data

Apr. 6, 2001 (JP) ........................... 2001-108797

(51) Int. Cl.[7] ............................. B05D 3/02; B05D 7/22; B05D 7/24; C09D 151/08
(52) U.S. Cl. .................................... 427/239; 427/388.4
(58) Field of Search .............................. 427/239, 388.4

(56) References Cited

U.S. PATENT DOCUMENTS

| 3,236,915 A | 2/1966 | Aanaboni et al. ........... 260/864 |
| 3,932,356 A | 1/1976 | Takagi ........................ 260/75 |
| 4,504,609 A | 3/1985 | Kuwajima et al. .......... 523/501 |

FOREIGN PATENT DOCUMENTS

| EP | 6334 A1 | 1/1980 |
| EP | 0554780 A1 | 8/1993 |
| JP | 56-151769 A | 11/1981 |
| JP | 63-041934 B | 8/1988 |
| JP | 04-081456 | 3/1992 |
| JP | 07-138523 A | 5/1995 |
| JP | 07-145342 A | 6/1995 |
| JP | 11-106446 | 4/1999 |
| JP | 2001-146569 | * 5/2001 |
| JP | 2004-026913 | * 1/2004 |
| JP | 2004-149593 | * 5/2004 |
| WO | WO 79/00732 A1 | 10/1979 |
| WO | WO 2004-020541 | * 3/2004 |

OTHER PUBLICATIONS

European Search Report dated May 13, 2004, for EP1384764.

* cited by examiner

*Primary Examiner*—Erma Cameron
(74) *Attorney, Agent, or Firm*—Armstrong, Kratz, Quintos, Hanson & Brooks, LLP

(57) ABSTRACT

A water-based coating composition for the inner surface of cans which comprises an aqueous medium and dispersed therein an acrylic-modified polyester resin (C) obtained by graft-polymerizing one or more polymerizable unsaturated vinyl monomers (B) comprising a carboxylated polymerizable unsaturated monomer with a polyester resin (A) having a number-average molecular weight of 2,000 to 100,000 and a hydroxyl value of 10 to 120 mg-KOH/g and containing ethylenically unsaturated double bonds, the resin (C) being in a neutralized form, and which further contains a resol resin crosslinking agent (D) in an amount of 1 to 40 parts by weight per 100 pans by weight of the acrylic-modified polyester resin (C): and a method of coating the inner surface of a can with the water-based coating composition.

9 Claims, No Drawings

WATER-BASED COATING COMPOSITION FOR INNER SURFACE OF CAN AND METHOD OF COATING INNER SURFACE OF CAN

TECHNICAL FIELD

The present invention relates to an aqueous coating composition applied to the inner surface of a can and a method for coating the inner surface of a can.

BACKGROUND ART

In order to prevent environmental pollution caused by the volatilization of organic solvents, in the field of coating compositions for coating the inner surfaces of cans, such as food cans, aqueous coating compositions are gradually replacing organic solvent-based coating compositions. As aqueous coating compositions, Japanese Examined Patent Publication No. 1988-41934 and Japanese Unexamined Patent Publication No. 1995-138523 propose acrylic-modified epoxy resin based aqueous coating compositions that are obtained by reacting or mixing epoxy resins and carboxyl-containing acrylic resins.

However, in order to obtain a coating film with satisfactory coatability and excellent properties, in the aqueous coating compositions heretofore used, a high-molecular-weight epoxy resin obtained by reacting a low-molecular-weight bisphenol A epoxy resin with bisphenol A is generally used as the starting epoxy resin. Therefore, some portion of bisphenol A remains in the coating composition unreacted. However, bisphenol A is one of the chemicals has recently been identified as a possible environmental hormone, which has led to a strong demand for the development of a coating composition that is free from bisphenol A leaching.

DISCLOSURE OF THE INVENTION

Objects of the present invention are to provide an excellent aqueous coating composition for the inner coating of a can that is excellent in processability, chemical resistance, and free from leaching bisphenol A, and to provide a method for coating the inner surface of a can.

Other objects and features of the invention will become apparent from the following description.

The present inventors conducted extensive research, and found that the above objects can be achieved by subjecting an acrylic-modified polyester resin obtainable by graft polymerizing a specific polyester resin with a polymerizable unsaturated vinyl monomer that includes a carboxyl-containing polymerizable unsaturated monomer to neutralization and dispersion in an aqueous medium, then combining the resulting aqueous resin with a resole phenol resin cross-linking agent. The invention has been accomplished based on this finding.

The invention provides the following aqueous coating compositions and methods for coating the inner surface of a can.

1. An aqueous coating composition for coating the inner surface of a can obtainable by subjecting an acrylic-modified polyester resin (C) obtainable by graft polymerizing a polyester resin having ethylenic double bonds (A) that has a number average molecular weight of 2,000 to 100,000 and a hydroxyl value of 10 to 120 mgKOH/g with a polymerizable unsaturated vinyl monomer (B) that includes a carboxyl-containing polymerizable unsaturated monomer to neutralization and dispersion in an aqueous medium, the aqueous coating composition containing 1 to 40 parts by weight of resole phenol resin cross-linking agent (D) based on 100 parts by weight of the acrylic-modified polyester resin (C).

2. The aqueous coating composition for coating the inner surface of a can according to Item 1, wherein a polybasic acid component, which is one of the constituent components of the polyester resin (A), contains 0.5 to 15 mol. % of a polybasic acid having an ethylenic double bond.

3. The aqueous coating composition for coating the inner surface of a can according to Item 1 or 2, wherein a polyhydric alcohol component, which is one of the constituent components of the polyester resin (A), contains 3 to 15 mol. % of polyhydric alcohol having valence 3 or more.

4. The aqueous coating composition for coating the inner surface of a can according to any one of Items 1 to 3, wherein the glass transition temperature of the polyester resin (A) is in the range of 30° C. to 70° C.

5. The aqueous coating composition for coating the inner surface of a can according to any one of Items 1 to 4, wherein the number average molecular weight of the acrylic-modified polyester resin (C) is in the range of 10,000 to 50,000.

6. The aqueous coating composition for coating the inner surface of a can according to any one of Items 1 to 5, wherein the acid value of the acrylic-modified polyester resin (C) is in the range of 15 to 100 mgKOH/g.

7. The aqueous coating composition for coating the inner surface of a can according to any one of Items 1 to 6, wherein the proportion by weight of the polyester resin (A) and the polymerizable unsaturated vinyl monomer (B) on a solids basis is in the range of resin(A)/monomer(B)=20/80 to 90/10.

8. A method for coating the inner surface of a can, comprising the steps of applying an aqueous coating composition for coating the inner surface of a can according to any one of Items 1 to 7 to the inner surface of a formed can and baking the coating.

9. A method for coating the inner surface of a can, comprising the steps of applying an aqueous coating composition for coating the inner surface of a can according to any one of Items 1 to 7 to a metal plate, baking the coating and forming the plate into a can in such a manner that the surface of the cured coating film on the metal plate becomes the inner surface of the can.

The following is a more detailed description of the aqueous coating composition for coating the inner surface of a can, and the methods for coating the inner surface of a can using the same according to the invention.

The aqueous coating composition for coating the inner surface of a can of the present invention contains an acrylic-modified polyester resin (C) and a resole phenol resin cross-linking agent (D).

Acrylic-Modified Polyester Resin (C)

The acrylic-modified polyester resin (C) used in the present invention is obtained by graft polymerizing a polyester resin having an ethylenic double bond or ethylenic double bonds (A) with a polymerizable unsaturated vinyl monomer (B) including a carboxyl-containing polymerizable unsaturated monomer.

Polyester Resin having Ethylenic Double Bonds (A)

The above-described polyester resin having ethylenic double bonds (A) is an esterification product basically obtained by a reaction between a polybasic acid component and a polyhydric alcohol component.

As a polybasic acid component, at least one dibasic acid selected from among phthalic anhydride, isophthalic acid, terephthalic acid, tetrahydrophthalic anhydride, hexahydrophthalic anhydride, hexahydroisophthalic acid, hexahydroterephthalic acid, succinic acid, adipic acid, sebacic acid, etc., is generally used. If necessary, benzoic acid, crotonic acid, p-t-butylbenzoic acid and like monobasic acids, trimellitic anhydride, methylcyclohexen tricarboxylic acid, pyromellitic anhydride and like polybasic acids having a basicity of three or more, etc., are used in combination. In the polybasic acid components, it is preferable that the content of aromatic dicarboxylic acid be 60 to 100 mol. %, from the viewpoint of coating film hardness and other characteristics. It is more preferable that the aromatic dicarboxylic acid contain terephthalic acid in the ratio of 30 to 100 mol. %, from the viewpoint of coating film hardness and other characteristics. These polybasic acid components can be used singularly or in a combination of two or more.

As polyhydric alcohol components, such as ethylene glycol, diethylene glycol, 1,2-propylene glycol, 1,3-propanediol, 1,4-butanediol, neopentyl glycol, 3-methylpentanediol, 1,4-hexanediol, 1,6-hexanediol, 1,4-cyclohexanedimethanol and like dihydric alcohols are generally used. If necessary, glycerin, trimethylolethane, trimethylolpropane, pentaerythritol and like polyhydric alcohols having valence 3 or more can be additionally used. From the viewpoint of properties of the coating film and the resin manufacturing stability, it is preferable that a polyhydric alcohol having valence 3 or more be contained in a polyhydric alcohol component in the ratio of 3 to 15 mol. %, and more preferably 4 to 10 mol. %. These polyhydric alcohols can be used singularly or in a combination of two or more.

Esterification of polybasic acid components and polyhydric alcohol components can be carried out in a conventional manner. In the esterification reaction, it is also possible to conduct an ester exchange reaction using lower alkyl esters of polybasic acids (for example, methyl ester, ethyl ester, etc.) instead of polybasic acids. The ester exchange reaction can be conducted in a manner known per se.

The polyester resin having ethylenic double bonds (A) is a resin that contains an unsaturated polybasic acid having an ethylenic double bond as a constituent component. Examples of unsaturated polybasic acids include fumaric acid, maleic acid, itaconic acid, citraconic acid, their lower alkyl esters, their acid anhydrides, etc. The polybasic acids having an ethylenic double bond can be used singularly or in a combination of two or more. From the viewpoint of manufacturing stability during the graft polymerization of the polymerizable unsaturated vinyl monomer (B) conducted in a later step, it is preferable that unsaturated polybasic acids having an ethylenic double bond be contained in the polybasic acid components in a ratio of 0.5 to 15 mol. %, and more preferably 1 to 5 mol. %.

A polybasic acid having an ethylenic double bond can be added from the beginning of the reaction; however, if it is added from the beginning of the reaction, an acrylic monomer branches when subjected to graft polymerization and tends to gel, which may lower manufacturing stability. Therefore, from the viewpoint of manufacturing stability, it is preferable that ethylenic double bonds be introduced into the end portions of the saturated polyester resin by adding acid anhydrides of polybasic acids having an ethylenic double bond, after synthesizing a saturated polyester resin with no unit element attributable to a polybasic acid having an ethylenic double bond, and by being added to hydroxyl groups contained in saturated polyester resin at 100 to 160° C.

From the viewpoint of achieving a balance between hardness and processability, it is preferable that the polyester resin having ethylenic double bonds (A) have a glass transition temperature of 30° C. to 70° C., and more preferably 40° C. to 60° C. From the viewpoint of processability, retort resistance, etc., the number average molecular weight is preferably 2,000 to 100,000, and more preferably 2,500 to 20,000. From the same viewpoint, the hydroxyl value is preferably 10 to 120 mgKOH/g, and more preferably 30 to 100 mgKOH/g.

Polymerizable Unsaturated Vinyl Monomer (B)

The polymerizable unsaturated vinyl monomer (B) used in the present invention contains, as essential components, acrylic acid, methacrylic acid, itaconic acid, fumaric acid and like carboxyl-containing polymerizable unsaturated monomers. If necessary, it may contain other polymerizable unsaturated vinyl monomers.

Examples of other polymerizable unsaturated vinyl monomers include methyl (meth)acrylate, ethyl (meth)acrylate, propyl (meth)acrylate, n-butyl (meth)acrylate, i-butyl (meth)acrylate, t-butyl (meth)acrylate, 2-ethylhexyl (meth)acrylate, lauryl (meth)acrylate, benzyl (meth)acrylate, stearyl (meth)acrylate, cetyl (meth)acrylate and like $C_1$–$C_{18}$ alkyl esters of acrylic or methacrylic acids; cyclohexyl (meth)acrylate, isobornyl (meth)acrylate; styrene, α-methylstyrene, vinyltoluene and like aromatic vinyl monomers; hydroxyethyl (meth)acrylate, hydroxypropyl (meth)acrylate, hydroxybutyl (meth)acrylate, hydroxyamyl (meth)acrylate, hydroxyhexyl (meth)acrylate and like hydroxyalkyl (meth)acrylates; hydroxyl-containing caprolactone-modified alkyl (meth)acrylate and like hydroxyl-containing polymerizable unsaturated monomers that are obtained by subjecting one to five moles of ε-caprolactone to a ring-opening adding reaction relative to one mole of the hydroxyalkyl (meth)acrylate; acrylamide, methacrylamide, N-methoxymethyl (meth)acrylamide, N-ethoxymethyl (meth)acrylamide, N-n-propoxymethyl (meth)acrylamide, N-isopropoxymethyl (meth)acrylamide, N-n-butoxymethyl (meth)acrylamide, N-sec-butoxymethyl (meth)acrylamide, N-tert-butoxymethyl (meth)acrylamide and like acrylamide monomers; acrylonitrile, methacrylonitrile, vinyl acetate, ethylene, butadiene, and the like.

In the present description, "(meth)acrylate" means "acrylate or methacrylate," and "(meth)acrylamide" means "acrylamide or methacrylamide."

As carboxyl-containing polymerizable unsaturated monomers, acrylic acid, methacrylic acid and like carboxyl-containing acrylic monomers are preferably used.

If itaconic acid, fumaric acid and like monomers other than acrylic monomers are used as a carboxyl-containing polymerizable unsaturated monomer, it is appropriate that alkyl (meth)acrylate, hydroxyalkyl (meth)acrylate, (meth)acrylamide, acrylonitrile, methacrylonitrile and like acrylic monomers be additionally used as polymerizable unsaturated vinyl monomers.

The polymerizable unsaturated vinyl monomers (B) can be used singularly or in a combination of two or more. Here, it is desirable that the amount of the carboxyl-containing polymerizable unsaturated monomer used be adjusted so that the acid value of the acrylic-modified polyester resin (C) be in the range of 15 to 100 mgKOH/g, and more preferably 30 to 80 mgKOH/g, since the resultant acrylic-modified polyester resin (C) is made aqueous by introducing a carboxyl group thereinto.

As a method for synthesizing the acrylic-modified polyester resin (C) by graft polymerizing the polyester resin having ethylenic double bonds (A) with a polymerizable unsaturated vinyl monomer (B), it is possible to employ free-radical polymerization conducted in an organic solvent. For example, it is possible to employ a method where the polyester resin having ethylenic double bonds (A), a polymerizable unsaturated vinyl monomer (B), a radical polymerization initiator, and, if necessary, a chain transfer agent are added and heated at 90 to 120° C. for 1 to 5 hours.

As the polymerization initiator described above, it is possible to use an organic peroxide polymerization initiator, an azo polymerization initiator, etc. Examples of organic peroxide polymerization initiators include benzoyl peroxide, t-butylperoxy-2-ethyl hexanoate, di-t-butyl peroxide, t-butylperoxy benzoate, t-amylperoxy-2-ethyl hexanoate, and the like. Examples of azo polymerization initiators include azobisisobutyronitrile, azobisdimethylvaleronitrile, etc.

Examples of chain transfer agents include α-methylstyrene dimer, mercaptans, and the like.

It is preferable that the number average molecular weight of the acrylic-modified polyester resin (C) be in the range of 10,000 to 50,000, and more preferably in the range of 12,000 to 30,000.

It is preferable that the proportion by weight of the polyester resin having ethylenic double bonds (A) and the polymerizable unsaturated vinyl monomer (B) on a solids basis be in the range of resin (A)/monomer (B)=20/80 to 90/10, and more preferably in the range of 50/50 to 85/15. If the content of the polyester resin having ethylenic double bonds (A) is less than 20 wt. %, the resultant coating film tends to have inferior processability and retort resistance, and if its content exceeds 90 wt. %, the resultant coating film tends to have insufficient hardness and water resistance.

The thus synthesized acrylic-modified polyester resin (C) is neutralized and dispersed in an aqueous medium. As neutralizers, amines and ammonia are preferable. Examples of amines include, triethylamine, triethanolamine, dimethylethanolamine, diethylethanolamine, morpholine, and the like. Among those, triethylamine and dimethylethanolamine are especially preferable. The degree of neutralization of the acrylic-modified polyester resin (C) is not limited; however, neutralization with 0.3 to 1.0 equivalent of the neutralizer per carboxyl group in the resin is preferable.

The aqueous medium in which the acrylic-modified polyester resin (C) is dispersed may be water alone, or may be a mixture of water and an organic solvent. As the organic solvent, as long as it does not adversely affect the stability of the acrylic-modified polyester resin (C) in an aqueous medium, any known organic solvent can be used.

Examples of preferable organic solvents include alcohol solvents, cellosolve solvents, carbitol solvents, etc. Specific examples of organic solvents include n-butanol and like alcohol solvents; ethylene glycol monobutyl ether, ethylene glycol monoisopropyl ether, ethylene glycol monomethyl ether, propylene glycol monomethyl ether and like cellosolve solvents; diethylene glycol monoethyl ether and like carbitol solvents, etc. As organic solvents, water-immiscible inert organic solvents other than those mentioned above can be used insofar as they do not lower the stability of the acrylic-modified polyester resin in an aqueous medium. Examples of organic solvents include toluene, xylene and like aromatic hydrocarbon solvents; ethyl acetate, butyl acetate and like ester solvents; and methyl ethyl ketone, cyclohexanone and like ketone solvents. From the viewpoint of environmental protection, the amount of organic solvent in the aqueous coating composition of the present invention is preferably in the range of 50 wt. % or less in the aqueous medium.

The acrylic-modified polyester resin (C) can be neutralized and dispersed in an aqueous medium in a routine manner. For example, the acrylic-modified polyester resin (C) can be gradually added to the aqueous medium containing a neutralizer while stirring, or the acrylic-modified polyester resin (C) can be neutralized with a neutralizer, and then an aqueous medium can be added to the resultant neutralization product while stirring, or the neutralization product can be added to an aqueous medium while stirring.

Resole Phenol Resin Cross-Linking Agent (D)

The resole phenol resin cross-linking agent (D) used in the present invention is obtained by heating phenols and formaldehydes, subjecting them to condensation reaction in the presence of a reaction catalyst, and introducing a methylol group. The introduced methylol group can be alkyl-etherificated.

Examples of phenol components constituting the above mentioned phenol resin include o-cresol, p-cresol, p-tert-butylphenol, p-ethylphenol, 2,3-xylenol, 2,5-xylenol, p-tert-amylphenol, p-nonylphenol, p-cyclohexylphenol and like bifunctional phenols; phenol, m-cresol, m-ethylphenol, 3,5-xylenol, m-methoxyphenol and like trifunctional phenols; 2,4-xylenol, 2,6-xylenol and like monofunctional phenols; bisphenol B, bisphenol F and like tetrafunctional phenols, etc. These phenols can be used singularly or in a combination of two or more. It is preferable that phenol resins of bisphenol A not be used, because there is a risk of bisphenol A leaching.

Examples of formaldehydes used to prepare the phenol resin cross-linking agents include formaldehyde, paraformaldehyde, trioxane, etc. These formaldehydes can be used singularly or in a combination of two or more.

The proportion of the resole phenol resin cross-linking agent (D) is, based on 100 parts by weight of the acrylic-modified polyester resin (C), generally, 1 to 40 parts by weight, and preferably 3 to 20 parts by weight. If the proportion of the resole phenol resin cross-linking agent (D) is less than 1 part by weight, the cross-linking reaction is not performed sufficiently. Therefore, the resultant coating film will have inferior water resistance, hardness, etc. On the other hand, if its proportion exceeds 40 parts by weight, the resultant coating film will have inferior flexibility.

The aqueous coating composition of the present invention can, if necessary, contain surfactants, antifoaming agents and like known additives.

It is preferable that the solids content of the aqueous coating composition of the invention be in the range of about 15 to about 40 wt. %.

Method for Coating the Inner Surface of a Can

The aqueous coating composition of the present invention is suitable for coating the inner surfaces of cans, including food cans.

The above described aqueous coating composition may either be applied to the inner surface of a formed can, which is then baked (coating method I); or applied to a metal plate, which is baked, and then formed into a can in such a manner that the cured coating film surface becomes the inner surface of the can (coating method II).

Examples of methods for applying the aqueous coating composition to the surface of metal materials include roll coating, spray coating, brushing, blast coating, immersion electrodeposition, etc. Regarding the thickness of the coating film, the range of 2 to 30 μm is sufficient. The coating film is generally baked at about 150 to about 280° C., and preferably at about 180 to about 220° C. for about 20 to about 600 seconds, and preferably about 30 to about 300 seconds.

The can for use in coating method I is prepared, for example, by forming into a can a metal plate, such as an aluminum plate, a steel plate, and like metal plates; plated steel plates obtained by depositing zinc, chromium, tin, aluminum, or the like on the surface of a steel plate; or treated steel plates obtained by treating the surface of a steel plate with chromic acid, iron phosphate, zinc phosphate, or the like. The metal plate for use in coating method II may be one of the metal plates used as materials for preparing the can described above.

The aqueous coating composition of the present invention contains an acrylic-modified polyester resin and a resole phenol resin cross-linking agent. The aqueous coating composition makes it possible to form a coating film that is free from leaching of bisphenol A, and excellent in processability and chemical resistance, thus being highly useful as an aqueous coating composition for coating the inner surface of a can.

BEST MODE FOR CARRYING OUT THE INVENTION

The following Examples and Comparative Examples illustrate the present invention in further detail. In these examples, parts and percentages are basically shown by weight.

Production of Polyester Resin (A)

PRODUCTION EXAMPLE 1

Propylene glycol (118 parts), neopentyl glycol (105 parts), isophthalic acid (230 parts), terephthalic acid (63 parts), adipic acid (55 parts), fumaric acid (15 parts), and a polymerization catalyst (di-n-butyltin oxide) (0.2 part) were placed in a reaction vessel, heated, stirred, and subjected to an esterification reaction, while removing the water that was generated, obtaining a resin having a number average molecular weight of 2,500, a hydroxyl value of 56 mgKOH/g, and an acid value of 0.5 mgKOH/g. The resultant resin was diluted with cyclohexanone, producing a polyester resin solution (A-1) having a solids content of 60%.

PRODUCTION EXAMPLE 2

Propylene glycol (116 parts), neopentyl glycol (104 parts), isophthalic acid (228 parts), terephthalic acid (62 parts), adipic acid (73 parts), and a polymerization catalyst (di-n-butyltin oxide) (0.2 part) were placed in a reaction vessel, heated, stirred, and subjected to an esterification reaction, while removing the water that was generated. The resultant mixture was cooled when its acid value became 0.5 mgKOH/g or lower, cyclohexanone (125 parts) and maleic anhydride (39 parts) were added thereinto, and the mixture was maintained at 150° C. for three hours. Then, cyclohexanone (235 parts) was added thereinto, producing a polyester resin solution (A-2) having a solids content of 60%. The resin had a number average molecular weight of 3,000 and a hydroxyl value of 30 mgKOH/g.

Preparation of Aqueous Coating Composition

EXAMPLE 1

To the polyester resin solution (A-1) (833 parts) obtained in Production Example 1, methacrylic acid (125 parts), styrene (125 parts), ethyl acrylate (250 parts), benzoyl peroxide (17 parts), and ethylene glycol monobutyl ether (650 parts) were added, and the mixture was maintained at 90° C. for three hours, producing an acrylic-modified polyester resin solution. The resin had an acid value of 75 mgKOH/g. Then, triethylamine (59 parts), "Hitanol 3305N" (tradename of Hitachi Chemical Co., Ltd., cresol/p-tert-butyl phenol/formaldehyde based phenol resin solution, solids content of about 42%) (476 parts) and "Nacure 5225" (tradename of King Industries, Inc., amine-neutralized dodecylbenzenesulfonic acid solution, dodecylbenzenesulfonic acid content of 25%) (20 parts) were added thereinto and allowed to stand for about 10 minutes. While stirring intensely, deionized water (3,450 parts) was gradually added thereinto over 1 hour, giving an aqueous coating composition having a solids content of 20%, a viscosity of 600 mPa·s, and a particle diameter of dispersed particles of 120 nm.

EXAMPLE 2

To the polyester resin solution (A-2) (900 parts) obtained in Production Example 2, methacrylic acid (135 parts), styrene (135 parts), ethyl acrylate (270 parts), benzoyl peroxide (19 parts), and ethylene glycol monobutyl ether (700 parts) were added and allowed to stand at 90° C. for three hours, producing an acrylic-modified polyester resin solution. The resin had an acid value of 92 mgKOH/g. Then, triethylamine (64 parts), "Hitanol 3305N" (514 parts), and "Nacure 5225" (26 parts) were added thereinto and allowed to stand for about 10 minutes. Thereafter, while stirring intensively, deionized water (3,700 parts) was gradually added to the mixture over one hour, thus producing an aqueous coating composition having a solids content of 20%, a viscosity of 300 mPa·s, and a particle diameter of the dispersed particles of 180 nm.

EXAMPLE 3

To the polyester resin solution (A-2)(900 parts) obtained in Production Example 2, methacrylic acid (115 parts), styrene (77 parts), ethyl acrylate (193 parts), benzoyl peroxide (14 parts), and ethylene glycol monobutyl ether (560 parts) were added and allowed to stand at 90° C. for three hours, producing an acrylic-modified polyester resin solution. The resultant resin had an acid value of 60 mgKOH/g. Then, triethylamine (49 parts), "Hitanol 3305N" (440 parts), and "Nacure 5225" (22 parts) were added thereinto and allowed to stand for about 10 minutes. While stirring the resultant mixture intensely, deionized water (3,200 parts) was gradually added thereinto over one hour, producing an aqueous coating composition having a solids content of 20%, a viscosity of 190 mPa·s, and a particle diameter of the dispersed particles of 260 nm.

COMPARATIVE EXAMPLE 1

Ethylene glycol monobutyl ether (1,200 parts) was placed in a reaction vessel, heated to 100° C., and allowed to stand. A solution of methacrylic acid (400 parts), styrene (500 parts), ethyl acrylate (100 parts), "Perbutyl O" (tradename of NOF Corporation, peroxide polymerization initiator) (35 parts), and ethylene glycol monobutyl ether (140 parts) was added to the ethylene glycol monobutyl ether dropwise over 3 hours. After completion of the addition, the resulting mixture was aged at 100° C. for 2 hours, and then n-butanol (570 parts) was added, producing a carboxyl-containing acrylic resin solution with a solids content of 36%. The resin had a number average molecular weight of about 7,000 and an acid value of 260 mgKOH/g.

In another reaction vessel, "Epikote 828EL" (tradename of Yuka-Shell Epoxy Co. Ltd., bisphenol A epoxy resin, epoxy equivalent of about 190, number average molecular weight of about 350) (1,000 parts), bisphenol A (556 parts), ethylene glycol monobutyl ether (172 parts), and a 50% aqueous tetramethylammonium solution (1.6 parts) were added while stirring, heated to 140° C., and allowed to stand at the same temperature for five hours, producing an epoxy resin solution having a solids content of 90%. The resultant resin had an epoxy equivalent of 3,000, and a number average molecular weight of 8,000.

Then, to the epoxy resin solution (1,000 parts), the above described carboxyl-containing acrylic resin solution (630 parts) and ethylene glycol monobutyl ether (110 parts) were added, and this was followed by uniform stirring. Then, the temperature was lowered to 85° C., deionized water (50 parts) and dimethylethanolamine (60 parts) were added, and the mixture was allowed to stand for one hour. Deionized water (2,600 parts) was then added dropwise over one hour, producing an aqueous coating composition having a solids content of 25%, a viscosity of 3,000 mPa·s, and a particle diameter of the dispersed particles of 180 nm.

Performance Test of Aqueous Coating Composition

The aqueous coating compositions obtained in Examples 1 to 3, and Comparative Example 1 were spray coated onto clean, tin-free steel having a thickness of 0.23 mm in such a manner that the coating film would have a thickness of 10 μm when dried, and then cured by baking at 200° C. for three minutes, obtaining coated plates. Using the resultant plates, the performance of the coating films was evaluated based on the test methods described below. The concentration of bisphenol A of each aqueous coating composition was also measured.

Test Methods

Gel fraction: The cured coating film was subjected to solvent extraction under reflux of acetone for 6 hours. The gel fraction was obtained by calculating the percentage (%) ratio of the weight of the coating film remaining after extraction to the weight of the coating film before extraction.

Adhesion to base metal: The coating film side surface of two coated plates (150 mm×5 mm) were defined as adhered surfaces, and a nylon film was placed between the two adhered surfaces, heated to 200° C. for 60 seconds, and pressed together at 200° C. for 30 seconds, to obtain a test sample having the nylon film adhered to the coating films. Then, the T peel adhesive strength of the test sample was evaluated by a tension tester ("Autograph AGS-500A", tradename, manufactured by Shimadzu Corporation) The tension test was conducted under the temperature of 20° C. and a speed of 200 mm/min.

Processability: A coated plate was cut into pieces each having a size of 40 mm×50 mm. Each piece was folded in two with the coated side out, a 3 kg of weight was dropped onto the folded portion from a height of 42 cm, then an area having a width of up to 20 mm from the folded edge was immersed in a 1% aqueous sodium chloride solution. The value of the electric current was then measured while applying an electric current with a voltage of 6.5 V to the folded portion for six seconds. The smaller the value of the electric current, the better the processability.

Corrosion resistance: The coated plate was cut into pieces each having a size of 150 mm×70 mm. Then, the coating film was crosscut so that the cuts extended to the base metal. Then, using the coated plate, a salt spray test was conducted for three weeks. The coated plates after completion of the test were visually observed and evaluated according to the following criteria.

A: The width of corrosion on each side of the cut portion is less than 2 mm;
B: The width of corrosion on each side of the cut portion is 2 mm or more but less than 5 mm; or
C: The width of corrosion on each side of the cut portion is 5 mm or more.

Acid resistance: A coated plate with sealed back and cut surfaces was immersed in a 10% aqueous hydrochloric acid solution at 20° C. for one week, and visually observed the coated side and evaluated according to the following criteria.
A: No irregularity was observed.
B: Slight blushing was observed.
C: Extreme blushing was observed.

Alkali resistance: A coated plate with sealed back and cut surfaces was immersed in a 10% aqueous caustic soda solution at 20° C. for one week, and visually observed the coated side and evaluated according to the following criteria.
A: No irregularity was observed.
B: Slight blushing was observed.
C: Extreme blushing was observed.

Concentration of bisphenol A: The aqueous coating compositions obtained in each of the examples were dissolved in tetrahydrofuran, and the concentration of bisphenol A contained in the aqueous coating composition was measured by high performance liquid chromatography.

Table 1 shows the results.

TABLE 1

|  | Example | | | Com. EX. |
| --- | --- | --- | --- | --- |
|  | 1 | 2 | 3 | 1 |
| Gel fraction (%) | 92.1 | 89 | 88 | 91 |
| Adhesion to base metal (kg/5 mm) | 1.9 | 2.3 | 2.1 | 2 |
| Processability (mA) | 1.45 | 1.21 | 0.54 | 0.45 |
| Corrosion resistance | A | A | A | A |
| Acid resistance | A | A | A | A |
| Alkali resistance | A | A | A | A |
| Concentration of bisphenol A (ppm) | Not detected | Not detected | Not detected | 40 |

What is claimed is:

1. An aqueous coating composition for coating the inner surface of a metal can obtained by subjecting an acrylic-modified polyester resin (C) obtained by graft polymerizing a polyester resin having ethylenic double bonds (A) that has a number average molecular weight of 2,000 to 100,000 and a hydroxyl value of 10 to 120 mgKOH/g with a polymerizable unsaturated vinyl monomer (B) that includes a carboxyl-containing polymerizable unsaturated monomer to neutralization and dispersion in an aqueous medium, the aqueous coating composition containing 1 to 40 parts by weight of resole phenol resin cross-linking agent (D) based on 100 parts by weight of the acrylic-modified polyester resin (C).

2. The aqueous coating composition for coating the inner surface of a metal can according to claim 1, wherein a polybasic acid component, which is one of the constituent components of the polyester resin (A), contains 0.5 to 15 mol. % of a polybasic acid having an ethylenic double bond.

3. The aqueous coating composition for coating the inner surface of a metal can according to claim 1 or 2, wherein a polyhydric alcohol component, which is one of the constituent components of the polyester resin (A), contains 3 to 15 mol. % of polyhydric alcohol having valence 3 or more.

4. The aqueous coating composition for coating the inner surface of a metal can according to claim 1 or 2, wherein the glass transition temperature of the polyester resin (A) is in the range of 30° C. to 70° C.

5. The aqueous coating composition for coating the inner surface of a metal can according to claim 1 or 2, wherein the number average molecular weight of the acrylic-modified polyester resin (C) is in the range of 10,000 to 50,000.

6. The aqueous coating composition for coating the inner surface of a metal can according to claim 1 or 2, wherein the acid value of the acrylic-modified polyester resin (C) is in the range of 15 to 100 mgKOH/g.

7. The aqueous coating composition for coating the inner surface of a metal can according to claim 1 or 2, wherein the proportion by weight of the polyester resin (A) and the polymerizable unsaturated vinyl monomer (B) on a solids basis is in the range of resin(A)/monomer(B)=20/80 to 90/10.

8. A method for coating the inner surface of a metal can, comprising the steps of applying an aqueous coating composition for coating the inner surface of a metal can according to claim 1 or 2 to the inner surface of a formed metal can and baking the coating.

9. A method for coating the inner surface of a metal can, comprising the steps of applying an aqueous coating composition for coating the inner surface of a metal can according to claim 1 or 2 to a metal plate, baking the coating and forming the plate into a can in such a manner that the surface of the cured coating film on the metal plate becomes the inner surface of the can.

\* \* \* \* \*